(12) United States Patent
Breuer et al.

(10) Patent No.: US 10,484,828 B2
(45) Date of Patent: *Nov. 19, 2019

(54) TECHNIQUES FOR INDOOR NAVIGATION WITH OCCUPANCY TRACKING AND LOCATION TRACKING VIA LIGHT-BASED COMMUNICATION

(71) Applicant: OSRAM SYLVANIA Inc., Wilmington, MA (US)

(72) Inventors: Christian Breuer, Dortmund (DE); Bernhard Siessegger, Unterschleissheim (DE); Anant Aggarwal, Waltham, MA (US)

(73) Assignee: OSRAM SYLVANIA Inc., Wilmington, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/127,789

(22) PCT Filed: Mar. 24, 2015

(86) PCT No.: PCT/US2015/022320
§ 371 (c)(1),
(2) Date: Sep. 20, 2016

(87) PCT Pub. No.: WO2015/148561
PCT Pub. Date: Oct. 1, 2015

(65) Prior Publication Data
US 2017/0099572 A1    Apr. 6, 2017

Related U.S. Application Data

(60) Provisional application No. 61/970,316, filed on Mar. 25, 2014.

(51) Int. Cl.
*H04W 24/00* (2009.01)
*H04W 4/029* (2018.01)
(Continued)

(52) U.S. Cl.
CPC .......... *H04W 4/029* (2018.02); *G01C 21/206* (2013.01); *G01S 19/48* (2013.01); *H04B 10/116* (2013.01);
(Continued)

(58) Field of Classification Search
CPC ........ H04W 64/00; H04W 4/02; H04W 48/04
See application file for complete search history.

(56) References Cited

U.S. PATENT DOCUMENTS

| 7,035,650 B1 | 4/2006 | Moskowitz et al. |
| 2004/0075572 A1 | 4/2004 | Bauschmann et al. |

(Continued)

FOREIGN PATENT DOCUMENTS

| CN | 102301827 A | 12/2011 |
| CN | 102415077 A | 4/2012 |

(Continued)

OTHER PUBLICATIONS

Nicolas Vanhaecke, International Search Report and Written Opinion of the International Searching Authority for PCT/US2015/022323, dated Oct. 1, 2015, pp. 1-19, European Patent Office, Rijswijk, The Netherlands.

(Continued)

*Primary Examiner* — Stephen M D Agosta
(74) *Attorney, Agent, or Firm* — Yutian Ling (57) ABSTRACT

Techniques are disclosed for enhancing indoor navigation using light-based communication (LCom). In some cases, an LCom-enabled luminaire configured as described herein may acquire user data from a local computing device and relay it to a server that tracks and analyzes the data to assess statistics for the luminaire's local spatial environment. The disclosed luminaire may receive from a local computing device a request for indoor navigation to a target of interest, such as a remote computing device. The luminaire may relay (Continued)

that request to a downstream luminaire, which delivers the request to the target. The target may respond with data that allows for tracking of its location and indoor navigation thereto, regardless of whether that target is moving or stationary. In a network of such luminaires, data distribution via inter-luminaire communication may be provided, for example, via an optical interface or other wired or wireless communication.

13 Claims, 3 Drawing Sheets (51) Int. Cl.
H04W 4/024 (2018.01)
G01C 21/20 (2006.01)
H04B 10/116 (2013.01)
H05B 37/02 (2006.01)
G01S 19/48 (2010.01)
H04W 4/02 (2018.01)

(52) U.S. Cl.
CPC ............ H04W 4/02 (2013.01); H04W 4/024 (2018.02); H05B 37/0227 (2013.01); H05B 37/0245 (2013.01)

(56) References Cited

U.S. PATENT DOCUMENTS

| | | | |
|---|---|---|---|
| 2006/0056855 A1 | 3/2006 | Nakagawa et al. | |
| 2007/0047506 A1* | 3/2007 | Froehling | H04W 52/0216 370/338 |
| 2008/0281515 A1 | 11/2008 | Ann et al. | |
| 2009/0171571 A1 | 7/2009 | Son et al. | |
| 2010/0029302 A1* | 2/2010 | Lee | H04W 4/02 455/456.6 |
| 2010/0164732 A1 | 7/2010 | Wedig et al. | |
| 2011/0001715 A1* | 1/2011 | Cha | H04M 1/0247 345/173 |
| 2012/0209513 A1* | 8/2012 | Walker | G01C 21/362 701/431 |
| 2012/0239584 A1* | 9/2012 | Yariv | G01C 21/3438 705/319 |

FOREIGN PATENT DOCUMENTS

| | | |
|---|---|---|
| CN | 102954793 A | 3/2013 |
| CN | 102967397 A | 3/2013 |
| WO | 2005/116519 A1 | 12/2005 |
| WO | 2008/148039 A1 | 12/2008 |
| WO | 2013/005122 A1 | 1/2013 |

OTHER PUBLICATIONS

Nicolas Vanhaecke, International Search Report and Written Opinion of the International Searching Authority for PCT/US2015/022320, dated Oct. 27, 2015, pp. 1-18, European Patent Office, Rijswijk, The Netherlands.

Nicolas Vanhaecke, International Search Report and Written Opinion of the International Searching Authority for PCT/US2015/022534, dated Oct. 14, 2015, pp. 1-17, European Patent Office, Rijswijk, The Netherlands.

English Translation of CN102954793A.
English Translation of CN102967307A.
English Translation of CN102415077A.
English Translation of CN102301827A.
First Office Action for counterpart Chinese Application No. CN201580027597.1, National Intellectual Property Administration, P.R. China, dated Dec. 7, 2018, and English Translation, 27 pages.

* cited by examiner

TECHNIQUES FOR INDOOR NAVIGATION WITH OCCUPANCY TRACKING AND LOCATION TRACKING VIA LIGHT-BASED COMMUNICATION

CROSS-REFERENCE TO RELATED APPLICATIONS

This patent application is a National Stage application of, and claims the benefit of, International Application No. PCT/US2015/22320, filed Mar. 24, 2015, which claims the benefit of U.S. Provisional Patent Application No. 61/970,316, titled "Light Communication Location Tracking," filed on Mar. 25, 2014, both of which are herein incorporated by reference in their entirety.

FIELD OF THE DISCLOSURE

The present disclosure relates to solid-state lighting (SSL) and more particularly to light-based communication via SSL.

BACKGROUND

Global positioning system (GPS) devices are commonly used to facilitate navigation on Earth. These GPS devices are designed to communicate with orbiting satellites that transmit location and time information. Closer to the Earth's surface, such satellite-based navigation can be supplemented using local area wireless technologies, such as Wi-Fi, which utilize radio frequency (RF) signals to communicate with nearby compatible devices. These types of wireless technologies typically employ wireless access points (Wi-Fi hotspots) to establish network access, and in cases of secured wireless networks, a password or other security credentials normally must be provided in order to gain network access.

These and other features of the present embodiments will be understood better by reading the following detailed description, taken together with the figures herein described. The accompanying drawings are not intended to be drawn to scale. In the drawings, each identical or nearly identical component that is illustrated in various figures may be represented by a like numeral. For purposes of clarity, not every component may be labeled in every drawing.

DETAILED DESCRIPTION

Techniques are disclosed for enhancing indoor navigation using light-based communication (LCom). In some cases, an LCom-enabled luminaire configured as described herein may acquire user data from a local computing device and relay it to a server. The server may track and analyze the data to assess any occupancy-based or other user-related statistics of interest for the spatial environment local to that LCom-enabled luminaire. In some cases, an LCom-enabled luminaire configured as described herein may receive from a local computing device a request for indoor navigation to a target of interest, such as a remote computing device. The LCom-enabled luminaire may relay that request to one or more downstream LCom-enabled luminaires, which in turn may deliver the request to the target. The target may respond with data that allows for tracking of its current location and indoor navigation thereto, regardless of whether the target is moving or stationary. To this end, note that the target may be, for example, a physical location, such as a storefront or terminal, or a person. In a network of such LCom-enabled luminaires, data distribution via inter-luminaire communication may be provided, in accordance with some embodiments, via an optical interface or other wired or wireless communication means. In some cases, the network may include a luminaire that is not LCom-enabled yet still configured for inter-luminaire communication. Numerous configurations and variations will be apparent in light of this disclosure.

General Overview

Existing smartphone and mobile computing device-based indoor navigation systems utilize a combination of global positioning system (GPS) and Wi-Fi positioning system (WPS) technologies to provide navigation capabilities. However, these existing GPS-based and Wi-Fi-based techniques suffer from a number of limitations that make their use impractical for indoor navigation, especially in complex and dynamic environments, such as airports, train stations, hospitals, and shopping malls, for example. In particular, GPS has an accuracy of only several meters, and the availability and range of Wi-Fi network connections are limited by factors such as the placement of Wi-Fi hotspots, security restrictions imposed by network providers, and other environmental factors. Thus, the combination of GPS and Wi-Fi can fail to achieve sufficiently refined accuracies for purposes of indoor navigation in such environments. Further difficulties arise in cases where both the navigator and the target of interest are moving. In addition, these types of environments inhibit obtaining occupancy-based and user-specific data that may be of interest to store owners, facility managers, and users, among others.

Thus, and in accordance with some embodiments of the present disclosure, techniques are disclosed for enhancing indoor navigation using light-based communication (LCom). The techniques may be particularly useful, for example, in complex and dynamic indoor environments, where indoor targets can be located and tracked and occupancy patterns can be assessed, in accordance with some embodiments. As used herein, light-based communication (LCom) generally refers to communication between a solid-state luminaire and a receiver device, such as another solid-state luminaire or a smartphone or other mobile computing device, using a pulsing light signal that is encoded with data. In general, the light utilized in LCom may be of any spectral band, visible or otherwise, and may be of any intensity, as desired for a given target application or end-use. In accordance with some embodiments, a given LCom-enabled luminaire may be configured to transmit a pulsing light signal encoded with data (an LCom signal), and a given receiver device, such as a smartphone or other mobile computing device, may be configured to detect the pulsing light signal encoded with data via one or more light-sensing devices, such as a camera or an ambient light sensor (or both).

In some cases, an LCom-enabled luminaire configured as described herein may acquire user data from a local computing device and relay it to a server. The server may track and analyze the data to assess any occupancy-based or other user-related statistics of interest for the spatial environment local to that LCom-enabled luminaire. In some cases, an LCom-enabled luminaire configured as described herein may receive from a local computing device a request for indoor navigation to a target of interest, such as a remote computing device. The LCom-enabled luminaire may relay that request to one or more downstream LCom-enabled luminaires, which in turn may deliver the request to the target. The target may respond with data that allows for tracking of its current location and indoor navigation thereto, regardless of whether the target is moving or stationary. In a network of such LCom-enabled luminaires, data distribution via inter-luminaire communication may be provided, in accordance with some embodiments, via an optical interface or other wired or wireless communication means. In some cases, the network may include a luminaire that is not LCom-enabled yet still configured for inter-luminaire communication.

In accordance with some embodiments, a network of LCom-enabled luminaires configured as described herein may be utilized to acquire data from occupants' computing devices within the spatial environment local to a given constituent LCom-enabled luminaire. This data may be tracked and analyzed, for example, by a processor, server, or other network element to provide any of a wide range of statistics related to each such localized spatial environment. For instance, data acquired by the network may be analyzed to assess occupancy patterns, dwell times, infrastructure usage, visitation frequency, and preferred pathways, among other occupancy-based and user-related statistics. Such data tracking and analyses may be performed separately or simultaneously, and in some cases may be performed during indoor navigation (described below). In some cases, the network may perform such data tracking and analysis in real time. As will be appreciated in light of this disclosure, these and other such statistics may be utilized, for example, in making control decisions, optimizing traffic within a given spatial region, and providing customized or otherwise focused content delivery to a local occupant. In a specific example case, advertisements based on user patterns may be delivered to particular occupants to enhance sales. In another specific example case, an alert or other assistance may be directed to a target occupant in an emergency or other urgent situation. Numerous suitable uses and contexts will be apparent in light of this disclosure.

In accordance with some embodiments, a network of LCom-enabled luminaires configured as described herein may be utilized for indoor navigation to a target location or computing device of interest. To that end, a given LCom-enabled luminaire configured as described herein may transmit an LCom signal including data that may be utilized by a recipient computing device, for example, in providing for navigation and tracking. In a network of such luminaires, data distribution via inter-luminaire communication may be provided, in accordance with some embodiments, via an optical interface or other wired or wireless communication means. Thus, such a network may be used, for example, to locate, track, and navigate to a target of interest within a complex and dynamic indoor environment, regardless of whether that target is moving or stationary. In some cases, data tracking and analysis (described above) may be provided while also providing such indoor navigation.

As will be appreciated in light of this disclosure, techniques disclosed herein can be utilized in any of a wide range of LCom applications and contexts. For example, techniques disclosed herein can be utilized in transmitting location and positioning information between an LCom-enabled luminaire and a receiver device. This information may be utilized to provide for navigation to a stationary or moving target or other indoor navigation. In some cases, techniques disclosed herein can be utilized as the basis for a positioning and navigation system that may realize improvements in positioning precision and accuracy, for example, over existing GPS-based and WPS-based systems. As such, it follows that techniques disclosed herein can be utilized, in accordance with some embodiments, for navigation and tracking-related endeavors not possible with existing GPS-based and Wi-Fi-based approaches. More particularly, while the limited accuracy of existing GPS-based and Wi-Fi-based approaches is not sufficient for directing a user to a moving target within a building, techniques disclosed herein can be utilized, in accordance with some embodiments, to lead a user directly to such target, for example, with real-time navigation updates. In some cases, techniques disclosed herein may be utilized to provide indoor navigation with such features without need for internet service access.

In accordance with some embodiments, occupancy, location, and other data tracking and analysis can be limited to a specific, local network of LCom-enabled luminaires. That is, if desired, a given LCom-enabled luminaire or computing device can communicate directly with another LCom-enabled luminaire or computing device on the same network without involvement of a server. In this manner, a given user may be allowed to actively accept or reject a request for occupancy and location tracking without intervention by a server, thus enhancing user privacy.

As will be appreciated in light of this disclosure, techniques disclosed herein can be utilized, for example, in residential buildings, commercial buildings, or any other structure that may host an LCom-enabled luminaire configured as described herein. As will be further appreciated, techniques disclosed herein may be utilized in any of a wide range of indoor environments and contexts, such as, for example, airports, train stations, hospitals, and shopping malls, among others. Numerous configurations and variations will be apparent in light of this disclosure.

System Architecture and Operation

Figure 1:
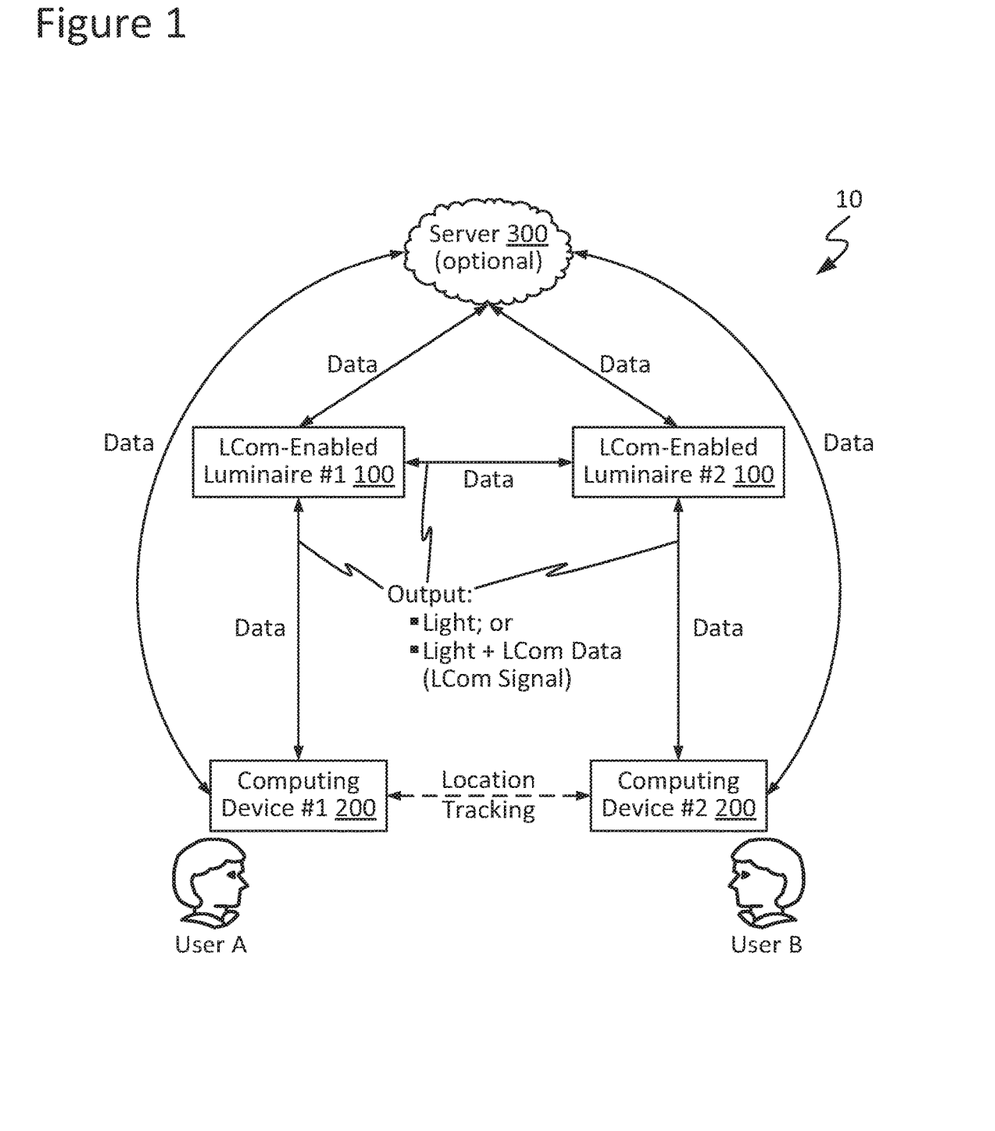
FIG. 1 is a block diagram illustrating an example light-based communication (LCom) network configured in accordance with an embodiment of the present disclosure.

FIG. 1 illustrates an example light-based communication (LCom) network 10 configured in accordance with an embodiment of the present disclosure. As can be seen, network 10 may include one or more LCom-enabled luminaires 100. As discussed herein, a given LCom-enabled luminaire 100 may be configured to output visible light encoded with data (an LCom signal). Using these LCom signals, light-based communication can be provided between an LCom-enabled luminaire 100 of network 10 and a computing device 200, between multiple LCom-enabled luminaires 100 of network 10, or both.

Figure 2A:
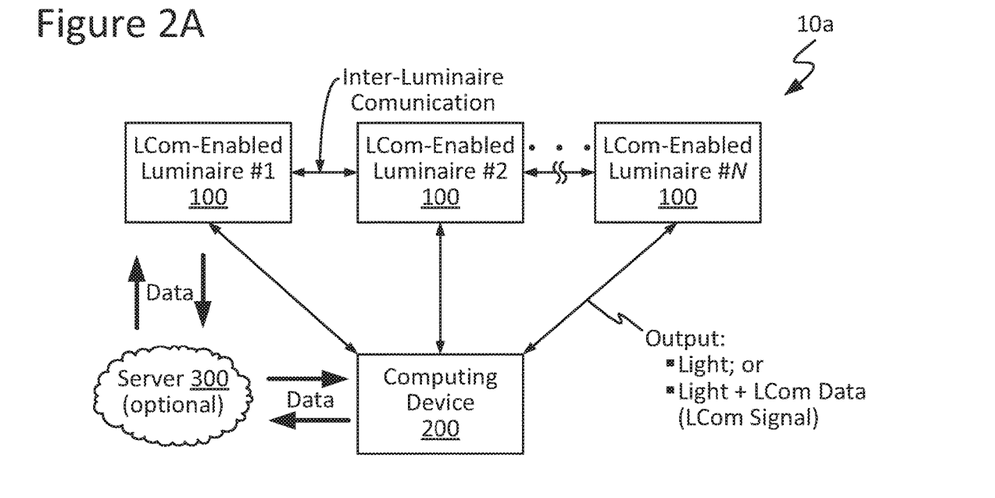
FIG. 2A is a block diagram illustrating an example LCom network configured in accordance with an embodiment of the present disclosure.
Figure 2B:
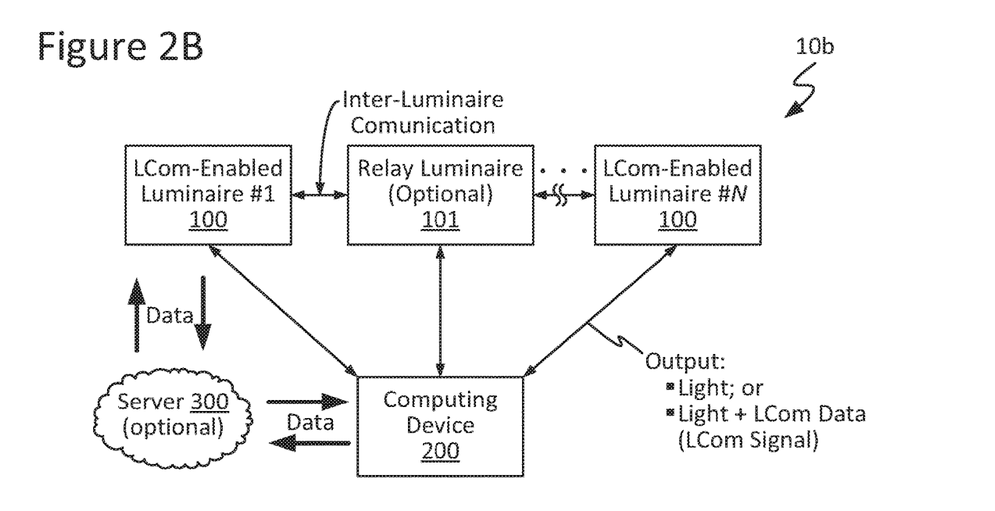
FIG. 2B is a block diagram illustrating an example LCom network configured in accordance with another embodiment of the present disclosure.

FIG. 2A illustrates an example LCom network 10*a* configured in accordance with an embodiment of the present disclosure. FIG. 2B illustrates an example LCom network 10*b* configured in accordance with another embodiment of the present disclosure. It should be noted that for consistency and ease of understanding of the present disclosure, networks 10a and 10b hereinafter may be collectively referred to generally as a network 10, except where separately referenced.

As can be seen from these figures, in some cases, inter-luminaire communication within network 10 may be provided directly between constituent LCom-enabled luminaires 100. In some other cases, inter-luminaire communication within network 10 may be provided indirectly between constituent LCom-enabled luminaires 100 via one or more intervening solid-state luminaires 101 or other intervening relay elements. Thus, data may be exchanged directly or indirectly (or both) between constituent luminaires of network 10.

Network 10 optionally may include one or more solid-state luminaires 101 configured to be utilized in relaying data within network 10. Such solid-state luminaires 101 may be configured substantially the same as a given LCom-enabled luminaire 100 but need not be LCom-enabled. In some cases, a given relay luminaire 101 may be a solid-state luminaire configured as typically done and retrofitted to provide any relay capabilities desired for a given target application or end-use. In any case, a given solid-state luminaire 101 may be considered, in a general sense, a relay or pass-through luminaire within network 10. In a general sense, a given relay luminaire 101 may be effectively transparent to data traffic in the network 10, transmitting any signal received, in some cases unaltered and in real time. When optionally included within network 10, a given relay luminaire 101 may serve to facilitate the relay of information within network 10, in accordance with an embodiment. To such ends, a given relay luminaire 101 may be configured with any of a wide range of capabilities, including those of a transceiver (e.g., receiving and transmitting signals), a repeater (e.g., receiving a signal and passing that same signal downstream), a transponder (e.g., transmitting a particular signal in response to receipt of a particular signal), or a combination thereof.

In some cases, LCom may be provided in only one direction within network 10. For instance, a given LCom-enabled luminaire 100 (transmitter) may transmit an LCom signal to another LCom-enabled luminaire 100 (receiver), a relay luminaire 101, a computing device 200 (receiver), or a combination thereof. In some cases, computing device 200 (transmitter) may transmit an LCom signal to a given LCom-enabled luminaire 100 (receiver). In some other cases, LCom may be provided in multiple directions (e.g., bi-directionally or otherwise multi-directionally) within network 10. For instance, a given LCom-enabled luminaire 100, relay luminaire 101, or computing device 200 (or combination thereof) may act in a transmitting and receiving (e.g., transceiver) capacity. In some instances, a bi-directional data link may be provided between a given computing device 200 and a given LCom-enabled luminaire 100. In some instances, a bi-directional data link may be provided between LCom-enabled luminaires 100 of network 10.

All or some sub-set of the constituent luminaires 100 and 101 (if optionally included) of network 10 may be configured for communicative coupling with one another. This inter-luminaire communication may be provided in a number of ways. For example, in accordance with some embodiments, a given LCom-enabled luminaire 100 may be configured to communicate with another LCom-enabled luminaire 100 directly, as generally shown with respect to network 10a. In accordance with some other embodiments, a given LCom-enabled luminaire 100 may be configured to communicate with another LCom-enabled luminaire 100 indirectly, for example, through one or more relay luminaires 101, as generally shown with respect to network 10b. In either case, a given luminaire 100 or 101 (if any) may be provided with an optical communication interface, such as a communication module 170 (discussed below), that permits wired or wireless (or both) communication between constituent luminaires of network 10, with a computing device 200, or other targeted recipient. In some cases, a solid-state luminaire 101 may be retrofitted with a communication module 170 that is configured to provide for inter-luminaire communication with another luminaire 101 or an LCom-enabled luminaire 100 (or both) within network 10. In accordance with some embodiments, all (or some sub-set) of the optical wireless interfaces may use the same data packet structure, regardless of whether the communication exists between an LCom-enabled luminaire 100 and either a computing device 200, a relay luminaire 101, or another LCom-enabled luminaire 100. Each LCom data packet propagated within network 10 may contain information pertaining to the source luminaire, the destination luminaire, or both. LCom data packets may be routed in network 10 based on the spatial mapping and layout of its constituent luminaires 100 and 101 (if any). As discussed below, a given communication module 170 can utilize any of a wide range of wired and wireless communications means, including, for example, a radio frequency (RF) signal, an infrared (IR) signal, or a combination thereof, among others. In some cases, an RF-based backbone may be provided in addition to IR-based luminaire-to-luminaire communication. In this manner, the luminaire-to-luminaire communication may provide a gateway functionality between luminaires connected to different backbones (e.g., between two ZigBee networks, or between a ZigBee and a DALI backbone). Numerous configurations will be apparent in light of this disclosure.

The constituent luminaires 100 and 101 (if any) of network 10 can be arranged as desired. In accordance with an embodiment, the constituent luminaires 100 and 101 (if any) of network 10 may be arranged to provide an unobstructed line of sight (LOS) between luminaires. To that end, in some cases, luminaires 100 and 101 (if any) of network 10 may be positioned above a recessed ceiling or other mounting surface. In some other cases, luminaires 100 and 101 (if any) of network 10 may be positioned on a ceiling or other mounting surface without any intervening structures that otherwise would impede LOS there between. In a more general sense, network 10 may be arranged such that that each constituent luminaire 100 and 101 (if any) has at least one other luminaire in its direct LOS. In some cases, a given luminaire 100 or 101 (if any) may be configured to receive data from or transmit data to (or both) only an immediately neighboring luminaire, LCom-enabled or otherwise.

As will be appreciated in light of this disclosure, selection of the type of transmission means for inter-luminaire communication may be based on considerations pertaining to, for example, line of sight (LOS) availability, latency, data packet loss, immunity to noise interference as wireless bands become increasingly more crowded, expense (e.g., resulting from additional processor, antenna, etc.), and data packaging format and processing, among others. In some cases, use of techniques disclosed herein may provide for inter-luminaire communication without requiring performance of electro-optical translations every time data is received or transmitted. In some cases, use of techniques disclosed herein may provide for inter-luminaire communication in a network including a mixture of LCom-enabled luminaires 100 and traditional solid-state luminaires. Other suitable means for providing inter-luminaire communication will depend on a given application and will be apparent in light of this disclosure.

In accordance with some embodiments, network 10 or computing device 200 (or both) optionally may be configured for communicative coupling with a server 300. Server 300 can be any suitable communication network, public or private. In some instances, server 300 may include a second-generation (2G), a third-generation (3G), or a fourth-generation (4G) mobile communication technology, or a combination of any one or more thereof. In some cases, server 300 may be a private local area network (LAN) operatively coupled to a wide area network (WAN), such as the internet. In some instances, server 300 may include a wireless local area network (WLAN) that utilizes wireless a data communication technology, such as Wi-Fi or Bluetooth, among others. In some cases, server 300 may include supporting infrastructure and functionalities, such as a server and a service provider, but such features are not necessary to carry out communication via server 300. In accordance with some embodiments, server 300 may be configured to provide data to network 10 or to computing device 200 (or both) that can be utilized to supplement data acquired by network 10 (e.g., via a given sensor 160 of a given LCom-enabled luminaire 100, discussed below). In some embodiments, server 300 may be configured to provide data to network 10 or to computing device 200 (or both) that can be used in indoor navigation. For example, server 300 may provide positioning data, identification (ID) data, building layout data, or any other data of interest. In some cases, server 300 may include or otherwise have access to user statistics, so-called big data, or any other information of interest. Numerous suitable configurations for server 300 will be apparent in light of this disclosure.

Figure 3:
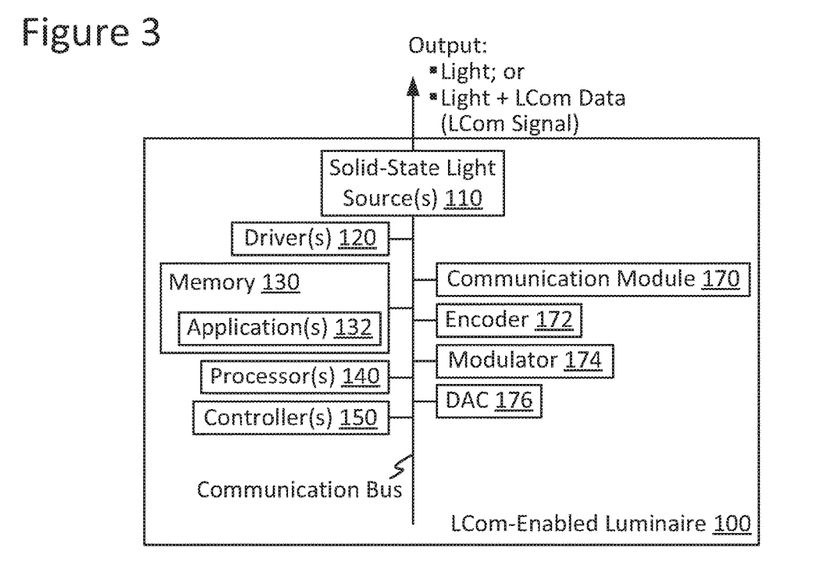
FIG. 3 is a block diagram illustrating an LCom-enabled luminaire configured in accordance with an embodiment of the present disclosure.

FIG. 3 is a block diagram illustrating an LCom-enabled luminaire 100 configured in accordance with an embodiment of the present disclosure. As discussed herein, a given LCom-enabled luminaire 100 may be configured to output light, light encoded with LCom data (e.g., an LCom signal), or both. Transmission of a given LCom signal may be performed at a given transmission rate over a given time interval, as desired for a given target application or end-use. In some cases, a given LCom-enabled luminaire 100 may be configured to repeatedly output its LCom signal(s). In any case, the LCom transmission characteristics of a given LCom-enabled luminaire 100 may be customized, as desired for a given target application or end-use.

In accordance with some embodiments, a given LCom-enabled luminaire 100 may include one or more solid-state light sources 110, the quantity, density, and arrangement of which can be customized, as desired for a given target application or end-use. A given solid-state light source 110 may include one or more solid-state emitters, which may be any semiconductor light source device, such as a light-emitting diode (LED), an organic light-emitting diode (OLED), or a polymer light-emitting diode (PLED), among others. A given solid-state emitter may be configured to emit light from the visible spectral band, the infrared (IR) spectral band, the ultraviolet (UV) spectral band, or any other portion of the electromagnetic spectrum, as desired for a given target application or end-use. In any case, a given solid-state emitter can be packaged or non-packaged, as desired, and in some cases may be populated on a printed circuit board (PCB) or other suitable intermediate or substrate, as will be apparent in light of this disclosure. In some cases, power and control connections for a given solid-state emitter may be routed from a given PCB to a driver 120 (discussed below) or other devices or componentry, as desired.

The emissions characteristics of a given solid-state light source 110 can be customized, as desired for a given target application or end-use. In some cases, a given solid-state light source 110 may be configured for emissions of a single correlated color temperature (CCT). For instance, a given solid-state light source 110 may be a white light-emitting semiconductor light source. In some other cases, however, a given solid-state light source 110 may be configured for color-tunable emissions. For instance, a given solid-state light source 110 may be a bi-color, tri-color, or other multi-color light-emitting semiconductor light source. Some example color combinations include red-green-blue (RGB), red-green-blue-yellow (RGBY), red-green-blue-white (RGBW), and dual-white, among others. In some instances, a given solid-state light source 110 may be a high-brightness semiconductor light source. Other suitable configurations for a given solid-state light source 110 of a given LCom-enabled luminaire 100 will depend on a given application and will be apparent in light of this disclosure.

In accordance with some embodiments, a given solid-state light source 110 also may include one or more optics optically coupled with its solid-state emitter(s). The optic(s) of a given solid-state light source 110 may be configured to transmit the one or more wavelengths of interest of the light emitted by solid-state emitter(s) optically coupled therewith. To that end, the optic(s) may include an optical structure, such as a window, lens, or dome, among others. A given optic may be formed from any suitable optical material, as will be apparent in light of this disclosure. The optic(s) of a given solid-state light source 110 may be formed from a single (e.g., monolithic) piece of optical material to provide a single, continuous optical structure or from multiple pieces of optical material to provide a multi-piece optical structure. Optical features such as an anti-reflective (AR) coating, a reflector, a diffuser, a polarizer, a brightness enhancer, or a phosphor material (e.g., which converts light received thereby to light of a different wavelength), among others, optionally may be included, as desired for a given target application or end-use. Other suitable configurations for the optic(s) of a given solid-state light source 110 will depend on a given application and will be apparent in light of this disclosure.

In accordance with some embodiments, LCom-enabled luminaire 100 may include or otherwise be communicatively coupled with a driver 120 configured for use in electronically driving the solid-state emitter(s) of its solid-state light source(s) 110. Driver 120 may be configured to control the on/off state, dimming level, color of emissions, correlated color temperature (CCT), color saturation of a given solid-state emitter (or grouping of emitters), or a combination of any one or more thereof. To such end, driver 120 may be a single-channel or multi-channel electronic driver and may utilize any suitable driving technique, such as, for example, pulse-width modulation (PWM) dimming, current dimming, constant current reduction (CCR) dimming, triode for alternating current (TRIAC) dimming, pulse-frequency modulation (PFM) dimming, pulse-code modulation (PCM) dimming, or line voltage (mains) dimming (e.g., dimmer is connected before input of driver 120 to adjust AC voltage to driver 120), among others. A given solid-state light source 110 also may include or otherwise be operatively coupled with other solid-state lighting circuitry and componentry, such as power conversion circuitry (e.g., electrical ballast circuitry to convert an AC signal into a DC signal at a desired current and voltage to power a given solid-state light source 110), constant current/voltage driver componentry, transmitter, receiver, or transceiver componentry, and local processing componentry, among others. Other suitable configurations for driver 120 and lighting control and driving techniques will depend on a given application and will be apparent in light of this disclosure.

In accordance with some embodiments, LCom-enabled luminaire 100 may include memory 130. Memory 130 can be random-access memory (RAM), read-only memory (ROM), a combination thereof, or any other suitable memory type. Memory 130 can be implemented with volatile memory, non-volatile memory, or a combination thereof. Memory 130 can be of any size, as desired for a given target application or end-use. In some cases, memory 130 may be configured to be utilized for processor workspace for processor(s) 140 (discussed below). In some cases, memory 130 may be configured for use in storing applications, media, programs, content, or a combination thereof, on a temporary or permanent basis. In some instances, memory 130 may be configured to serve as a cache for data, for example, pertaining to the location of the host LCom-enabled luminaire 100, alert information, advertisements, or any other data of interest. In some cases, memory 130 may serve as a cache for data pertaining to network 10. In some instances, memory 130 may be configured to store data received from optional server 300, destined for optional server 300, or both.

In accordance with some embodiments, memory 130 may have stored therein one or more modules. In accordance with some embodiments, memory 130 may have stored therein or otherwise have access to one or more applications 132. In some instances, a given LCom-enabled luminaire 100 may be configured to receive input, for example, via one or more applications 132 stored in memory 130 (e.g., such as a lighting pattern, LCom data, etc.). A given module of memory 130 can be implemented in any suitable standard, custom, or proprietary programming language, such as, for example, C, C++, objective C, or JavaScript, among others. A given module of memory 130 can be accessed and executed by a given processor 140 of LCom-enabled luminaire 100. In accordance with some embodiments, the module(s) of memory 130 can be encoded, for example, on a computer-readable medium that, when executed by a processor 140, carries out the functionality of a given LCom-enabled luminaire 100, in part or in whole. The computer-readable medium may be, for example, a hard drive, a compact disk, a memory stick, a server, or any other suitable non-transitory computer or computing device memory that includes executable instructions, or a plurality or combination of such memories. Other embodiments can be implemented, for instance, with gate-level logic or an application-specific integrated circuit (ASIC) or chip set, or other such purpose-built logic. Some embodiments can be implemented with a microcontroller having input/output (I/O) capability (e.g., inputs for receiving user inputs; outputs for directing other components) and a number of embedded routines for carrying out device functionality. In a more general sense, the functional module(s) of memory 130 (e.g., one or more applications 132) can be implemented in hardware, software, firmware, or a combination thereof, as desired for a given target application or end-use. Other suitable modules, applications, and data which may be stored in memory 130 or may be otherwise accessible to a given LCom-enabled luminaire 100 (e.g., via server 300 or elsewhere) will depend on a given application and will be apparent in light of this disclosure.

In accordance with some embodiments, LCom-enabled luminaire 100 may include one or more processors 140, which may be configured as typically done. In accordance with some embodiments, a given processor 140 may be configured to perform operations associated with a given host LCom-enabled luminaire 100. For instance, a given processor 140 may be configured to access and execute a given module within memory 130 or otherwise accessible to LCom-enabled luminaire 100 (e.g., via server 300 or elsewhere). In some cases, a given processor 140 may be configured, for example, to analyze data received from a computing device 200 or other portion of network 10 and to output data that may be utilized in providing indoor navigation with occupancy tracking, location tracking, or a combination thereof. Other suitable configurations for processor(s) 140 will depend on a given application and will be apparent in light of this disclosure.

In accordance with some embodiments, the one or more solid-state light sources 110 of LCom-enabled luminaire 100 can be electronically controlled to output light, light encoded with LCom data (e.g., an LCom signal), or both. To that end, a given LCom-enabled luminaire 100 may include or otherwise be communicatively coupled with one or more controllers 150. In some embodiments, a given controller 150 may be hosted by LCom-enabled luminaire 100 and operatively coupled with one or more solid-state light sources 110 thereof via a communication bus. In this example case, the controller 150 may output a digital control signal to a given solid-state light source 110 based on input (wired, wireless, or both) received from a given local source such as on-board memory 130, a given remote source such as optional server 300 or a control interface, or both local and remote sources. As a result, a given LCom-enabled luminaire 100 may be controlled in such a manner as to output any number of output beams, which may include light, light encoded with LCom data (e.g., an LCom signal), or both.

The present disclosure is not so limited, however. In some other embodiments, a given controller 150 may be hosted directly, in part or in whole, by a given solid-state light source 110 and operatively coupled with solid-state light source 110 via a communication bus. If LCom-enabled luminaire 100 includes a plurality of such solid-state light sources 110 hosting their own controllers 150, then each such controller 150 may be considered, in a sense, a mini-controller, providing LCom-enabled luminaire 100 with a distributed controller 150. In some such cases, a given controller 150 may be populated, for example, on a given PCB of the host solid-state light source 110. In this example case, a given controller 150 may output a digital control signal to an associated solid-state light source 110 based on input (wired, wireless, or both) received from a given local source such as on-board memory 130, a given remote source such as an optional server 300 or control interface, or both local and remote sources. As a result, a given LCom-enabled luminaire 110 may be controlled in such a manner as to output any number of output beams, which may include light, light encoded with LCom data (e.g., an LCom signal), or both.

In accordance with some embodiments, a given controller 150 may host one or more lighting control modules and can be programmed or otherwise configured to output one or more control signals to adjust the operation of the solid-state emitter(s) of a given solid-state light source 110. In some cases, a given controller 150 may be configured to output a control signal to control whether the light beam of a given solid-state emitter is on/off. In some instances, a given controller 150 may be configured to output a control signal to increase the intensity (brighten), decrease the intensity (dim), or otherwise control the intensity of the light emitted by a given solid-state emitter. In some cases, a given controller 150 may be configured to output a control signal to mix, tune, or otherwise control the color of the light emitted by a given solid-state emitter. Thus, if a given solid-state light source 110 includes two or more solid-state emitters configured to emit light having different wavelengths, the control signal may be used to adjust the relative brightness of the different solid-state emitters in order to change the mixed color output by that solid-state light source 110. In some embodiments, a given controller 150 may be configured to output a control signal to encoder 172 (discussed below) to facilitate encoding of LCom data for transmission by a given LCom-enabled luminaire 100. In some embodiments, a given controller 150 may be configured to output a control signal to modulator 174 (discussed below) to facilitate modulation of an LCom signal for transmission by a given LCom-enabled luminaire 100. Other suitable configurations and output for a given controller 150 of a given LCom-enabled luminaire 100 will depend on a given application and will be apparent in light of this disclosure.

In accordance with some embodiments, a given LCom-enabled luminaire 100 may include a communication module 170 configured to facilitate communication with another LCom-enabled luminaire 100, a relay luminaire 101 (if optionally present in network 10), a computing device 200, or a combination thereof. In some cases, communication module 170 may facilitate inter-luminaire communication directly between LCom-enabled luminaires 100, as generally shown with respect to network 10a in FIG. 2A. In some other cases, communication module 170 may facilitate inter-luminaire communication indirectly between LCom-enabled luminaires 100 through one or more relay luminaires 101, as generally shown with respect to network 10b in FIG. 2B. In some instances, communication module 170 may facilitate communication directly between a host LCom-enabled luminaire 100 and a computing device 200 local thereto. To such ends, communication module 170 may be configured to use any suitable communications means, such as radio frequency (RF) transmissions or infrared (IR) light modulation, among others. In some cases, communication module 170 may be configured for wired communication, for example, via Universal Serial Bus (USB), Ethernet, or FireWire, among others. In some cases, communication module 170 may be configured for wireless communication, for example, via Wi-Fi or Bluetooth, among others. In some instances, communication module 170 may be configured for a combination of wired and wireless communications. In a more general sense, communication module 170 may be configured to communicate utilizing any standard, custom, or proprietary communication protocol, such as, for example, a digital multiplexer (DMX) interface protocol, a Wi-Fi protocol, a Bluetooth protocol, a digital addressable lighting interface (DALI) protocol, a ZigBee protocol, or a combination thereof, among others. Other suitable configurations and wired and wireless communication means for communication module 170 will depend on a given application and will be apparent in light of this disclosure.

In accordance with some embodiments, the communication module 170 of a given LCom-enabled luminaire 100 (or solid-state luminaire 101, discussed above) may include a given quantity and arrangement of infrared (IR) transmitters and receivers. In an example case, a given luminaire 100 or 101 (if any) may be configured such that each side or other surface thereof includes both an IR transmitter channel and an IR receiver channel. Inter-luminaire communication via an optical (e.g., IR) wireless link may provide for low latency, in some cases providing real-time performance, for network 10. In some cases, use of optical wireless interfacing techniques described herein may allow for bi-directional communication (e.g., transmission and reception) over a single channel between any two luminaires, LCom-enabled or otherwise. In some cases, use of optical wireless interfacing techniques described herein may provide for low communication overhead, reduced data packet size, or both. More particularly, the same data packets as are used in LCom may be utilized in inter-luminaire communication, and thus no extra packet creation, interpretation, or integrity checks may be needed, in accordance with an embodiment. In some instances, LCom functionality and relay functionality (e.g., transceiver, repeater, transponder) within network 10 may share the same hardware abstraction layer (HAL). More particularly, the same HAL may be used regardless of whether the communication is between an LCom-enabled luminaire 100 and a computing device 200 or between two neighboring luminaires, LCom-enabled or otherwise. As will be appreciated in light of this disclosure, this may lead to lower computational and hardware requirements. In some cases, use of inter-luminaire communication techniques described herein may realize a reduction in system cost and hardware complexity as compared to existing approaches to communication techniques.

In accordance with some embodiments, LCom-enabled luminaire 100 may include an encoder 172, a modulator 174, and a digital-to-analog converter (DAC) 176. Encoder 172 may be configured to encode LCom data in preparation for transmission thereof by a host LCom-enabled luminaire 100. To that end, encoder 172 may be any suitable digital encoder configured as typically done. Modulator 174 may be configured to modulate an LCom signal in preparation for transmission thereof by the host LCom-enabled luminaire 100. Modulator 174 may be a single-channel or multi-channel electronic driver (e.g., such as driver 120) configured, for example, for use in controlling the output of the one or more solid-state emitters of a given solid-state light source 110. In some embodiments, modulator 174 may be configured to control the on/off state, dimming level, color of emissions, correlated color temperature (CCT), color saturation of a given solid-state emitter (or grouping of emitters), or a combination of any one or more thereof. To such end, modulator 174 may utilize any of the example driving techniques discussed above, for example, with respect to driver 120. DAC 176 may be configured to convert a digital control signal into an analog control signal to be applied to a given solid-state light source 110 of the host LCom-enabled luminaire 100 to output an LCom signal therefrom. To such end, DAC 176 may be any suitable digital-to-analog converter any may be configured as typically done. Other suitable configurations for encoder 172, modulator 174, and DAC 176 will depend on a given application and will be apparent in light of this disclosure.

Figure 4:
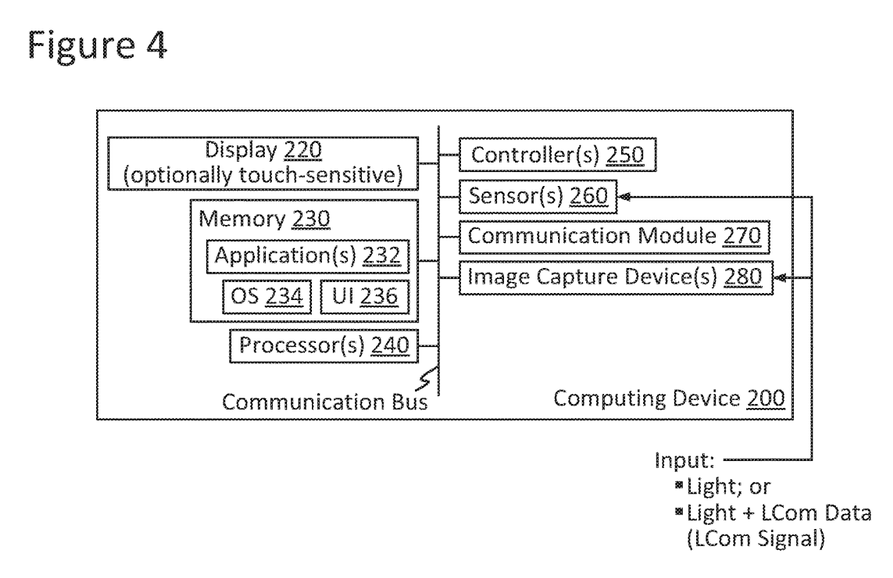
FIG. 4 is a block diagram illustrating a computing device configured in accordance with an embodiment of the present disclosure.

FIG. 4 is a block diagram illustrating a computing device 200 configured in accordance with an embodiment of the present disclosure. As discussed herein, computing device 200 may be configured to detect the light pulses of an LCom signal emitted by a transmitting LCom-enabled luminaire 100 and decode LCom data from a detected LCom signal. To such ends, computing device 200 can be any of a wide range of computing platforms, mobile or otherwise. For example, computing device 200 can be, in part or in whole, a laptop computer, notebook computer, sub-notebook computer, tablet computer, phablet computer, mobile phone, smartphone, personal digital assistant (PDA), portable media player (PMP), cellular handset, handheld gaming device, gaming platform, desktop computer, television set, wearable or otherwise body-borne computing device, such as a smartwatch, smart glasses, or smart headgear, or a combination of any one or more of the aforementioned. Other suitable configurations for computing device 200 will depend on a given application and will be apparent in light of this disclosure.

In accordance with some embodiments, computing device 200 may include memory 230. Memory 230 may be provided with any of the example configurations discussed above, for example, with respect to memory 130. In some cases, memory 230 may be configured to be utilized for processor workspace for processor(s) 240 (discussed below). In some cases, memory 230 may be configured for use in storing applications, media, programs, content, or a combination thereof, on a temporary or permanent basis. In some instances, memory 230 may be configured to serve as a cache for data, for example, pertaining to the location of the host computing device 200, alert information, advertisements, or any other data of interest. In some cases, memory 230 may serve as a cache for data pertaining to network 10. In some instances, memory 230 may be configured to store data received from optional server 300, destined for optional server 300, or both.

In accordance with some embodiments, memory 230 may have stored therein one or more modules. In accordance with some embodiments, memory 230 may have stored therein or otherwise have access to one or more applications 232. In some instances, computing device 200 may be configured to receive input, for example, via one or more applications 232 stored in memory 230. For instance, in accordance with some embodiments, memory 230 may have one or more applications 232 stored therein or otherwise accessible thereto. In an example case, memory 230 may have an indoor navigation application stored therein. In another example case, memory 230 may have stored therein an application for computing a route to a moving target with respect to a building or other structure. A given module of memory 230 can be implemented in any suitable standard, custom, or proprietary programming language, such as, for example, C, C++, objective C, or JavaScript, among others. A given module of memory 230 can be accessed and executed by a given processor 240 of computing device 200. In accordance with some embodiments, the module(s) of memory 230 can be encoded, for example, on a computer-readable medium that, when executed by a processor 240, carries out the functionality of computing device 200, in part or in whole. The computer-readable medium may be, for example, a hard drive, a compact disk, a memory stick, a server, or any other suitable non-transitory computer or computing device memory that includes executable instructions, or a plurality or combination of such memories. Other embodiments can be implemented, for instance, with gate-level logic or an application-specific integrated circuit (ASIC) or chip set, or other such purpose-built logic. Some embodiments can be implemented with a microcontroller having input/output (I/O) capability (e.g., inputs for receiving user inputs; outputs for directing other components) and a number of embedded routines for carrying out device functionality. In a more general sense, the functional module(s) of memory 230 (e.g., one or more applications 232) can be implemented in hardware, software, firmware, or a combination thereof, as desired for a given target application or end-use.

In accordance with some embodiments, memory 230 may have an operating system (OS) 234 stored therein or otherwise accessible thereto. OS 234 can be implemented with any suitable OS, mobile or otherwise, such as Android OS from Google, Inc., iOS from Apple, Inc., BlackBerry OS from BlackBerry Ltd., Windows Phone OS from Microsoft Corp., Palm OS/Garnet OS from Palm, Inc., or an open source OS such as Symbian OS, among others. OS 234 may be configured to aid in processing LCom data during its flow through computing device 200.

In accordance with some embodiments, memory 230 may have a user interface (UI) 236 stored therein or otherwise accessible thereto. In some cases, UI 236 of computing device 200 may be implemented in memory 230. In some other cases, UI 236 of computing device 200 may be implemented in a combination of locations, such as in memory 230 and at display 220 (discussed below), thereby providing UI 236 with a given degree of functional distributedness. UI 236 may be configured to present a graphical UI (GUI) at display 220 that aids in carrying out any of the various LCom-related techniques discussed herein. Other suitable modules (e.g., applications 232, OS 234, UI 236) and data that may be stored in memory 230 or otherwise accessible to computing device 200 (e.g., via server 300 or elsewhere) will depend on a given application and will be apparent in light of this disclosure.

In accordance with some embodiments, computing device 200 may include one or more processors 240, which may be configured as typically done. In accordance with some embodiments, a given processor 240 may be configured to perform operations associated with computing device 200. For instance, a given processor 240 may be configured to access and execute a given module within memory 230 or otherwise accessible to computing device 200 (e.g., via server 300 or elsewhere). Other suitable configurations for processor(s) 240 will depend on a given application and will be apparent in light of this disclosure.

In accordance with some embodiments, computing device 200 may include a display 220. Display 220 can be any electronic visual display or other display device configured to generate an image, video, text, or other displayable content there at. In some instances, display 220 may be integrated, in part or in whole, with computing device 200. In some other instances, display 220 may be a stand-alone component configured to be communicatively coupled with computing device 200 using any suitable communication means, wired or wireless (or both). Display 220 optionally may be a touchscreen display or other touch-sensitive display and can be configured as typically done to that end. In such cases, optionally touch-sensitive display 220 generally may be configured to detect or otherwise sense direct, proximate, or other contact from a user's finger, stylus, or other suitable implement at a given location of that display 220. Optionally touch-sensitive display 220 may be configured to translate such contact into an electronic signal that can be processed by computing device 200 (e.g., by the one or more processors 240 thereof) and manipulated or otherwise used to trigger a given GUI action. When included, optional touch-sensitive display 220 may facilitate user interaction with computing device 200 via the GUI presented by such display 220. Other suitable configurations for display 220 will depend on a given application and will be apparent in light of this disclosure.

In accordance with some embodiments, computing device 200 may include or otherwise be communicatively coupled with one or more controllers 250. A given controller 250 may be configured to output one or more control signals to control any one or more of the various components and modules of computing device 200 and may do so, for example, based on input (wired, wireless, or both) received from a given local source such as on-board memory 230, a given remote source such as optional server 300 or a control interface, or both local and remote sources. In accordance with some embodiments, a given controller 250 may host one or more control modules and can be programmed or otherwise configured to output one or more control signals to adjust the operation of computing device 200, in part or in whole. In some cases, a given controller 250 may be configured to output a control signal to control operation of a given sensor 260 (discussed below). In some cases, a given controller 250 may be configured to output a control signal to control operation of a given image capture device 280 (discussed below). Other suitable configurations and output for a given controller 250 will depend on a given application and will be apparent in light of this disclosure.

In accordance with some embodiments, computing device 200 may include or otherwise be communicatively coupled with one or more sensors 260. For example, computing device 200 optionally may include an ambient light sensor configured to detect ambient light levels (e.g., of the surrounding environment of computing device 200) and output a signal including data pertaining to that stimulus. In some cases, such ambient light sensor may be configured to detect LCom signal output of a transmitting LCom-enabled luminaire 100. Additional and different types of sensors 260 may be provided, as desired for a given target application or end-use.

A given sensor 260 may be configured to provide its output signal to its associated computing device 200. In some embodiments, a given sensor 260 may be on-board, built-in, or otherwise integrated with computing device 200. In some other embodiments, a given sensor 260 may be separate from but communicatively coupled with computing device 200. In any case, a given sensor 260 may include mechanical componentry, solid-state componentry, or both. A given sensor 260 may be configured to perform detection sampling as frequently as desired, and in some cases may do so in real time. Other suitable configurations for a given sensor 260 will depend on a given application and will be apparent in light of this disclosure.

In accordance with some embodiments, computing device 200 may include a communication module 270 configured to facilitate communication with a given LCom-enabled luminaire 100, another computing device 200, or an optional network 300, or a combination thereof. To such ends, communication module 270 may be configured to utilize any of the example communications means and transmission technologies and protocols discussed above, for instance, with respect to communication module 170. In some cases, communication module 270 may be configured to utilize a near field communication (NFC) protocol, a local area network (LAN)-based communication protocol, a cellular-based communication protocol, an Internet-based communication protocol, a satellite-based communication protocol, or a combination thereof. In some cases, communication module 270 of computing device 200 and communication module 170 of a given LCom-enabled luminaire 100 may be configured to utilize the same communications means. Other suitable configurations and wired and wireless communication means for communication module 270 will depend on a given application and will be apparent in light of this disclosure.

In accordance with some embodiments, computing device 200 may include or otherwise be communicatively coupled with one or more image capture devices 280, such as a front-facing image capture device, a rear-facing image capture device, or both. A given image capture device 280 can be any device configured to capture digital images, such as a still camera (e.g., a camera configured to capture still photographs) or a video camera (e.g., a camera configured to capture moving images comprising a plurality of frames). In some cases, a given image capture device 280 may include components such as, for instance, an optics assembly, an image sensor, an image encoder, a video encoder, or a combination of any one or more thereof. In some instances, a given image capture device 280 may be, for example, a camera like one typically found in smartphones or other mobile computing devices. In some embodiments, a given image capture device 280 may be on-board, built-in, or otherwise integrated with computing device 200. In some other embodiments, a given image capture device 280 may be separate from but communicatively coupled with computing device 200. Components of a given image capture device 280 may be implemented in hardware, software, firmware, or a combination of any one or more thereof. A given image capture device 280 can be configured to detect electromagnetic radiation (e.g., light), for example, from the visible spectral band, the infrared (IR) spectral band, the ultraviolet (UV) spectral band, or any other portion of the electromagnetic spectrum, as desired for a given target application or end-use. In some instances, a given image capture device 280 may be configured to continuously acquire imaging data. In some other instances, a given image capture device 280 may be configured to acquire imaging data upon detection of light that exceeds a luminous intensity level threshold or duration threshold (or both), which can be set at any standard or custom value, and in some cases may be user-configurable. In some other instances, a given image capture device 280 may be configured to acquire imaging data at periodic intervals, user-configurable intervals, or otherwise as frequently as desired for a given target application or end-use. As described herein, a given image capture device 280 of computing device 200 may be configured to detect LCom signal output of a transmitting LCom-enabled luminaire 100. Other suitable configurations for a given image capture device 280 will depend on a given application and will be apparent in light of this disclosure.

Indoor Navigation with Occupancy Tracking and Location Tracking

As discussed above, network 10 may include a plurality of LCom-enabled solid-state luminaires 100, and in some cases optionally may include one or more relay solid-state luminaires 101, a server 300, or both. Also, as discussed above, communication with and among portions of network 10 may occur directly, indirectly, or both, and may be provided via any of a wide range of communication means, such as, for example, an LCom signal (e.g., visible light encoded with data) or any other suitable data uplink/downlink connection (e.g., IR; RF). Furthermore, communication with and among portions of network 10 may be provided on a continuous, periodic, intermittent, or custom basis, which may be user-configurable in some instances. Thus, in accordance with some embodiments, a communication link between a given LCom-enabled luminaire 100 of network 10 and a given computing device 200 local thereto can be utilized to provide to network 10 data that may be used, for example, to provide indoor navigation to a target, moving or stationary, while providing occupancy tracking, location tracking, or a combination thereof. In some instances, data may be provided to network 10 in real time, allowing for real-time occupancy and location tracking. In some cases, computing device 200 may communicate information to a local LCom-enabled luminaire 100, which in turn may transmit the information over network 10, searching for a pinged target LCom-enabled luminaire 100. In some instances, computing device 200 optionally may communicate information alternatively, or additionally, to a server 300, which in turn may transmit the information over network 10. Numerous configurations will be apparent in light of this disclosure.

In accordance with some embodiments, network 10 may be utilized to provide indoor navigation with occupancy tracking. To that end, a first LCom-enabled luminaire 100 of network 10 may receive data from a first computing device 200 local thereto. For instance, the first computing device 200 may transmit to a first LCom-enabled luminaire 100 of network 10 data pertaining to its unique serial or other identification (ID) number. In accordance with an embodiment, such data may serve as a reply acknowledgment from the first computing device 200 of its receipt of an LCom signal transmitted by the first LCom-enabled luminaire 100. In this manner, network 10 may confirm the presence of the first computing device 200 (and an associated user). By virtue of the unique information transmitted by that computing device 200, network 10 may determine which specific computing device 200 (and associated user) is present.

In some cases, confirmation of a given user's presence may lead to collection of additional data from the first computing device 200 via the first LCom-enabled luminaire 100 (or other portion of network 10). In some cases, data collected from the first computing device 200 may be relayed within network 10 to a server 300, which in turn may log that information. As discussed above, server 300 may include or otherwise have access to user statistics, so-called big data, or any other information of interest. Thus, in accordance with some embodiments, network 10 may utilize data accessible via server 300, for example, to provide occupancy tracking. In some cases, additional information may be tracked, such as, for example, occupancy patterns within a spatial environment local to a given LCom-enabled luminaire 100, an occupant's dwell time within a spatial environment local to a given LCom-enabled luminaire 100, an occupant's usage of infrastructure local to a given LCom-enabled luminaire 100, an occupant's frequency of visitation of a spatial environment local to a given LCom-enabled luminaire 100, and an occupant's preferred pathway within a spatial environment local to a given LCom-enabled luminaire 100, among others. As will be appreciated in light of this disclosure, such statistics may be of interest to store owners, facility managers, and users, among others. In some cases, such data may be used, for example, to optimize or otherwise improve user traffic in a given spatial region.

In accordance with some embodiments, network 10 may collect data that may be logged by server 300 and utilized, for example, to provide a given user with a customized user experience in the local indoor environment. In some cases, user experience may be optimized or otherwise enhanced within the local indoor environment. For instance, if the user frequently goes shopping for a certain type of merchandise, and network 10 recognizes the presence of the user's first computing device 200 via a first LCom-enabled luminaire 100 local thereto, then network 10 may provide to that user at the first computing device 200 customized information, coupons, deals, advertisements, or any other tailored communication. In some cases, network 10 may provide to a computing device 200 focused content delivery that is user-specific. Thus, in some instances, network 10 may be utilized to enhance sales in a retail context.

In accordance with some embodiments, network 10 may be utilized to provide indoor navigation with location tracking. Thus, and in accordance with some embodiments, network 10 may provide for indoor navigation to a moving target of interest. To such ends, a first LCom-enabled luminaire 100 of network 10 may receive data from a first computing device 200 local thereto. For instance, the first computing device 200 may transmit to a first LCom-enabled luminaire 100 of network 10 data pertaining to a request for indoor navigation to a target second computing device 200, which may be moving or stationary. The recipient first LCom-enabled luminaire 100 may relay the request to a second LCom-enabled luminaire 100 local to the targeted second computing device 200, optionally facilitated by one or more relay solid-state luminaires 101 (if present in network 10). The recipient second LCom-enabled luminaire 100 then may transmit the indoor navigation request to the second computing device 200, which may respond with data that can be used to track the current location of that second computing device 200. In some cases, such data may be transmitted by the second computing device 200 in real time to facilitate real-time tracking thereof. In some instances, this may aid navigation in cases where that second computing device 200 is a moving target. In any case, data provided by the second computing device 200 may be relayed through network 10 to the first computing device 200 that made the initial indoor navigation request. In accordance with some embodiments, while providing indoor navigation to a target (moving or otherwise), network 10 also may be acquiring information from the user and transmitting that data to server 300.

In some cases, in response to receipt of the request for indoor navigation from the first computing device 200, the first LCom-enabled luminaire 100 may transmit (e.g., via an LCom signal) location data, such as its coordinates in space, to the first computing device 200 local thereto. Such data may be utilized by an application 232 included with or otherwise accessible to the first computing device 200 in determining its location and providing indoor navigation to a target of interest, moving or otherwise. In some cases, the first computing device 200 may include or otherwise have access to data pertaining to the details of a building map, which it may combine with data received from network 10 in providing indoor navigation to the target of interest.

In accordance with some embodiments, occupancy, location, and other data may be relayed directly between constituent LCom-enabled luminaires 100 of network 10. In accordance with some other embodiments, such data may be relayed through one or more intermediate relay solid-state luminaires 101 as it is passed between constituent LCom-enabled luminaires 100 of network 10. In any case, information relevant to occupancy tracking and location tracking may be forwarded from one portion of network 10 to another portion thereof to facilitate indoor navigation to a target of interest, moving or otherwise. Upon receipt of such data, a given LCom-enabled luminaire 100 may transmit an LCom signal including that data, which in turn may be detected and decoded by a local computing device 200, as described above. Depending on the configuration of network 10, LCom signal transmission may be provided by a single LCom-enabled luminaire 100 or by multiple LCom-enabled luminaires 100 transmitting individually or simultaneously, as desired. Network 10 may provide LCom signal transmissions as frequently as desired, and in some cases may provide them in real time.

As discussed above, LCom data received by computing device 200 may be utilized, in accordance with some embodiments, to provide indoor navigation with occupancy tracking, location tracking, or a combination thereof. To such ends, computing device 200 may utilize LCom data received via an LCom signal in computing a navigation route that may be followed by the user to navigate to a target of interest, moving or otherwise. In some instances, such computation may be performed, at least in part, via a processor 240, an application 232 included with or otherwise accessible to computing device 200, or both. The resultant navigation information may be provided to a user via UI 236 (e.g., a GUI) presented at display 220, in accordance with an embodiment.

The LCom signal transmitted by a given LCom-enabled luminaire 100 may include any of a wide range of data that may be utilized in providing indoor navigation with occupancy tracking, location tracking, or a combination thereof. For example, in some cases, information pertaining to a navigation map update may be included in a transmitted LCom signal. In some instances, a given LCom signal transmitted by network 10 may include data pertaining to the ID and location of a given LCom-enabled luminaire 100 transmitting the LCom signal. In some cases, a given LCom signal transmitted by network 10 may include data pertaining to the current positioning of computing device 200. In some instances, a given LCom signal transmitted by network 10 may include data pertaining to an advertisement or other alert. It should be noted, however, that the present disclosure is not so limited only to these examples, as in a more general sense, network 10 may be configured to relay data pertaining to any information of interest in providing indoor navigation with occupancy tracking and location tracking, or other indoor navigation. In any case, such data may be utilized, for example, in navigating to a target of interest, mobile or otherwise.

In some cases, indoor navigation by computing device 200 with occupancy tracking, location tracking, or a combination thereof, may utilize data provided by some source outside of network 10, such as, for example, a building management system (BMS), a Wi-Fi positioning system (WPS), or a global positioning system (GPS), among others. Such supplemental data may pertain to positioning, identification, alerts, advertisements, or any other desired information. When optionally provided, such supplemental data may be received by computing device 200 directly (e.g., via communication module 270), indirectly via a given LCom-enabled luminaire 100, or both.

In accordance with some embodiments, indoor navigation may be updated based on data received from network 10, a supplemental source, or both. Indoor navigation updates may be provided as frequently as desired, and in some cases may be provided in real time. Such updates may be provided with or without a pre-loaded map or other building layout, as desired. In accordance with some embodiments, indoor navigation information and other data acquired in real-time may be transmitted to computing device 200 via one or more LCom signals.

Consider the example case where a first user (User A) wishes to navigate to a second user (User B), a moving target. An indoor navigation request may be routed from User A's computing device 200 to network 10, for example, via the uplink from User A's computing device 200 to a local LCom-enabled luminaire 100. That local LCom-enabled luminaire 100 may broadcast the request to all (or some sub-set) of the other LCom-enabled luminaire(s) 100 of network 10. An LCom-enabled luminaire 100 local to User B's computing device 200 may transmit the request thereto. Upon receiving the transmitted request, User B's computing device 200 may respond with data about its current location. This response may be routed from User B's computing device 200 to network 10, for example, via the uplink from User B's computing device 200 to its local LCom-enabled luminaire 100. In accordance with some embodiments, this exchange of request and response may provide User A's computing device 200 with a dynamic destination/endpoint that is tracked, for example, via an indoor navigation application 232 on-board or otherwise accessible to User A's computing device 200. Once location tracking is established between the computing devices 200 of User A and User B, User A's requesting computing device 200 may track User B's responding computing device 200 in real time or as otherwise desired. If User B moves to a new location, the indoor navigation information presented at User A's computing device 200 (e.g., via an indoor navigation application 232) may be automatically updated to reflect User B's new location. Thus, User A's computing device 200 may utilize network 10 to locate User B and to provide indoor navigation information to allow User A to navigate to User B's location, even if User B's location is changing in real time.

In some instances, detection and decoding of a transmitted LCom signal may be performed only when computing device 200 is being used for indoor navigation. In some other instances, detection and decoding of a transmitted LCom signal may be performed when computing device 200 periodically pings the environment for the presence of an LCom signal. In some cases, a given sensor 260 (e.g., ambient light sensor), image capture device 280, or combination thereof may sample the local environment periodically for a few frames at a given interval, which may be user-configurable. In some other cases, a given sensor 260 (e.g., ambient light sensor), image capture device 280, or combination thereof may sample the local environment continually. In some instance, upon detection of an LCom signal, an application 232 may maintain reading of the LCom signal via a given sensor 260 (e.g., ambient light sensor), image capture device 280, or combination thereof and may output an appropriate indoor navigation instruction.

Numerous embodiments will be apparent in light of this disclosure. One example embodiment provides a solid-state luminaire including: a communication module configured to receive data from a first source external to the solid-state luminaire; a processor operatively coupled with the communication module and configured to analyze the data received thereby from the first external source; and a solid-state light source configured to emit a pulsing light signal encoded with the data. In some cases, the first external source includes a first mobile computing device; the data received from the first mobile computing device includes information about at least one of that first mobile computing device and a user thereof; and the communication module is further configured to transmit the data to a server. In some such cases, the data received from the first mobile computing device includes a unique serial number associated with that first mobile computing device. In some instances, a system may be provided, the system including: a solid-state luminaire configured as described herein; and the server, wherein the server is configured to analyze the data received from the communication module to assess at least one of: an occupancy pattern within a spatial environment local to the solid-state luminaire; an occupant's dwell time within a spatial environment local to the solid-state luminaire; an occupant's usage of infrastructure local to the solid-state luminaire; an occupant's frequency of visitation of a spatial environment local to the solid-state luminaire; and an occupant's preferred pathway within a spatial environment local to the solid-state luminaire. In some cases, the first external source includes a first mobile computing device; the data received from the first mobile computing device includes a request for indoor navigation to a second mobile computing device; and the communication module is further configured to transmit the indoor navigation request to a second solid-state luminaire local to the second mobile computing device. In some instances, the communication module is further configured to receive data from a second solid-state luminaire, the data originating from a second mobile computing device local to the second solid-state luminaire; and the data received from the second solid-state luminaire includes information about at least one of that second mobile computing device and a user thereof. In some cases, the processor is further configured to output data about at least one of a location of the solid-state luminaire, an identification (ID) of the solid-state luminaire, a building map update, an alert, and an advertisement; and the pulsing light signal emitted by the solid-state light source is encoded with that data. In some instances, the processor is further configured to output data received by the solid-state luminaire from at least one of a building management system (BMS), a Wi-Fi positioning system (WPS), and a global positioning system (GPS); and the pulsing light signal emitted by the solid-state light source is encoded with that data. In some cases, the first source external to the solid-state luminaire includes at least one of another solid-state luminaire and a mobile computing device; and the communication module is configured to utilize at least one of a radio frequency (RF) signal, an infrared (IR) signal, a digital multiplexer (DMX) interface protocol, a Wi-Fi protocol, a Bluetooth protocol, a digital addressable lighting interface (DALI) protocol, and a ZigBee protocol in communicating with the at least one of another solid-state luminaire and a mobile computing device. In some instances, a light-based communications system may be provided, the system including: a first solid-state luminaire configured as described herein; and at least one of: a second solid-state luminaire configured as in claim 1; and a solid-state luminaire configured to relay data received from the first solid-state luminaire configured as in claim 1 to a first remote recipient external thereto.

Another example embodiment provides a method of light-based communication including: receiving, via a first solid-state luminaire, data from a first source external to the first solid-state luminaire, wherein the first solid-state luminaire includes a solid-state light source configured to emit a pulsing light signal encoded with the data; and transmitting, via the first solid-state luminaire, the data to a first remote recipient external to the first solid-state luminaire. In some cases, the first external source includes a first computing device; the data received from the first computing device includes information about at least one of that first computing device and a user thereof; and the first remote recipient includes a server configured to analyze the data to assess at least one of: an occupancy pattern within a spatial environment local to the first solid-state luminaire; an occupant's dwell time within a spatial environment local to the first solid-state luminaire; an occupant's usage of infrastructure local to the first solid-state luminaire; an occupant's frequency of visitation of a spatial environment local to the first solid-state luminaire; and an occupant's preferred pathway within a spatial environment local to the first solid-state luminaire. In some such cases, the first computing device includes a mobile computing device. In some instances, the first external source includes a first computing device; the first remote recipient includes a second solid-state luminaire; and the data received from the first computing device includes a request for indoor navigation to a second computing device local to the second solid-state luminaire. In some such instances, the method further includes: transmitting, via the first solid-state luminaire, the coordinates in space of that first solid-state luminaire to the first computing device. In some other such instances, the method further includes: receiving, via the first solid-state luminaire, data from the second solid-state luminaire, that data originating from the second computing device and including information about at least one of that second computing device and a user thereof. In some still other such cases, at least one of the first and second computing devices includes a mobile computing device.

Another example embodiment provides a computing device including: at least one of an ambient light sensor and an image capture device configured to detect a pulsing light signal encoded with data transmitted by a solid-state luminaire; a communication module configured to at least one of receive data from and transmit data to the solid-state luminaire; and a processor operatively coupled with the communication module and configured to output data thereto, the data including at least one of: a unique serial number associated with the computing device; information about a user of the computing device; and a request for navigation to another computing device. In some cases, to detect the pulsing light signal encoded with data, the at least one of an ambient light sensor and an image capture device is configured to initially sample a local environment at a first interval and, upon detection of such signal, sample the local environment at a different second interval. In some instances, the computing device further includes: a memory operatively coupled with the processor and configured to at least one of: store data received from the solid-state luminaire; and store an indoor navigation application that utilizes data received from the solid-state luminaire in providing indoor navigation to a target.

The foregoing description of example embodiments has been presented for the purposes of illustration and description. It is not intended to be exhaustive or to limit the present disclosure to the precise forms disclosed. Many modifications and variations are possible in light of this disclosure. It is intended that the scope of the present disclosure be limited not by this detailed description, but rather by the claims appended hereto. Future-filed applications claiming priority to this application may claim the disclosed subject matter in a different manner and generally may include any set of one or more limitations as variously disclosed or otherwise demonstrated herein.

What is claimed is:

1. A system comprising:
   a solid-state luminaire comprising:
      a communication module configured to receive first data from a first source external to the solid-state luminaire, wherein the first external source comprises a first mobile computing device;
      a processor operatively coupled with the communication module and configured to analyze the first data received thereby from the first external source, wherein:
         the first data comprises information about at least one of the first mobile computing device and a first user thereof, and a request for indoor navigation to a second mobile computing device carried by a second user;
         the communication module is further configured to:
            transmit the indoor navigation request to the second mobile computing device by relaying the indoor navigation request to a second solid-state luminaire local to the second mobile computing device,
receive second data from the second solid-state luminaire, wherein the second data originates from the second mobile computing device and comprises a location of the second mobile computing device, and
transmit the first data to a server; and
a solid-state light source configured to emit a pulsing light signal encoded with the second data to the first external source; and
the server, wherein the server is configured to:
analyze the first data received from the communication module to assess user statistics for the first user, the user statistics comprising at least one of:
an occupancy pattern within a spatial environment local to the solid-state luminaire;
an occupant's dwell time within a spatial environment local to the solid-state luminaire;
an occupant's usage of infrastructure local to the solid-state luminaire; and
an occupant's frequency of visitation of a spatial environment local to the solid-state luminaire;
generate customized information for the first user based on the user statistics; and
transmit the customized information to the solid-state luminaire to be provided to the first mobile computing device.

2. The system of claim 1, wherein the first data further comprises a unique serial number associated with that first mobile computing device.

3. The system of claim 1, wherein:
the processor is further configured to output data about at least one of a location of the solid-state luminaire, an identification (ID) of the solid-state luminaire, a building map update, an alert, and an advertisement; and
the pulsing light signal emitted by the solid-state light source is encoded with that data.

4. The system of claim 1, wherein:
the processor is further configured to output data received by the solid-state luminaire from at least one of a building management system (BMS), a Wi-Fi positioning system (WPS), and a global positioning system (GPS); and
the pulsing light signal emitted by the solid-state light source is encoded with that data.

5. The system of claim 1, wherein:
the communication module is configured to utilize at least one of a radio frequency (RF) signal, an infrared (IR) signal, a digital multiplexer (DMX) interface protocol, a Wi-Fi protocol, a Bluetooth protocol, a digital addressable lighting interface (DALI) protocol, and a ZigBee protocol in communicating with the at least one of the second solid-state luminaire and the first mobile computing device.

6. The system of claim 1, further comprising the second solid-state luminaire.

7. The system of claim 1, further comprising:
the first mobile computing device, comprising:
at least one of an ambient light sensor and an image capture device configured to detect the pulsing light signal encoded with data.

8. A method of light-based communication, the method comprising:
receiving, via a first solid-state luminaire, first data from a first source external to the first solid-state luminaire, wherein the first solid-state luminaire comprises a solid-state light source configured to emit a pulsing light signal encoded with data, the first external source comprises a first computing device, and the first data comprises information about at least one of that first computing device and a first user thereof, and a request for indoor navigation to a second computing device carried by a second user;
transmitting, via the first solid-state luminaire, the first data to the second computing device via a second solid-state luminaire local to the second computing device that is configured to relay the first data to the second computing device;
receiving, via the first solid-state luminaire, second data from the second solid-state luminaire, wherein the second data originates from the second mobile computing device and comprises a location of the second mobile computing device;
transmitting, via the first solid-state luminaire, the second data to the first source;
transmitting, via the first solid-state luminaire, the first data to a server;
analyzing, via the server, the first data to assess user statistics for the first user, the user statistics comprising at least one of:
an occupancy pattern within a spatial environment local to the first solid-state luminaire;
an occupant's dwell time within a spatial environment local to the first solid-state luminaire;
an occupant's usage of infrastructure local to the first solid-state luminaire; and
an occupant's frequency of visitation of a spatial environment local to the first solid-state luminaire;
generating, via the server, customized information for the first user based on the user statistics; and
transmitting, via the server, the customized information to the first solid-state luminaire to be provided to the first computing device.

9. The method of claim 8 further comprising:
transmitting, via the first solid-state luminaire, the coordinates in space of that first solid-state luminaire to the first computing device.

10. The method of claim 8 further comprising:
receiving, via the first solid-state luminaire, data from the second solid-state luminaire, that data originating from the second computing device and comprising information about at least one of that second computing device and the second user.

11. The method of claim 8, wherein at least one of the first and second computing devices comprises a mobile computing device.

12. The system of claim 7, wherein to detect the pulsing light signal encoded with data, the at least one of an ambient light sensor and an image capture device is configured to initially sample a local environment at a first interval and, upon detection of such signal, sample the local environment at a different second interval.

13. The system of claim 7, wherein the first mobile computing device further comprises further comprising a memory configured to at least one of:
store data received from the solid-state luminaire; and
store an indoor navigation application that utilizes data received from the solid-state luminaire in providing indoor navigation to a target.

* * * * *